United States Patent
Eick et al.

(10) Patent No.: US 10,126,450 B2
(45) Date of Patent: Nov. 13, 2018

(54) BLACK HOLE BOUNDARY CONDITIONS

(71) Applicant: CONOCOPHILLIPS COMPANY, Houston, TX (US)

(72) Inventors: Peter M. Eick, Houston, TX (US); Joel Brewer, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 34 days.

(21) Appl. No.: 15/045,359

(22) Filed: Feb. 17, 2016

(65) Prior Publication Data

US 2016/0238728 A1    Aug. 18, 2016

Related U.S. Application Data

(60) Provisional application No. 62/117,511, filed on Feb. 18, 2015.

(51) Int. Cl.
*G06K 9/00* (2006.01)
*G01V 1/36* (2006.01)
*G01V 1/28* (2006.01)

(52) U.S. Cl.
CPC ............... *G01V 1/36* (2013.01); *G01V 1/282* (2013.01); *G01V 2210/32* (2013.01); *G01V 2210/67* (2013.01)

(58) Field of Classification Search
CPC .......... G01V 1/34–1/375; G01V 1/282; G01V 2210/32; G01V 2210/67
USPC ................ 382/109; 181/207, 288; 239/14.1; 376/347; 455/67.16
See application file for complete search history.

(56) References Cited

U.S. PATENT DOCUMENTS

| | | | |
|---|---|---|---|
| 5,671,136 A * | 9/1997 | Willhoit, Jr. | G01V 1/30 702/18 |
| 5,724,309 A * | 3/1998 | Higgs | G01V 1/32 367/48 |
| 5,999,488 A | 12/1999 | Smith | |
| 6,687,659 B1 | 2/2004 | Shen | |
| 8,467,267 B2 | 6/2013 | Eick et al. | |
| 8,717,846 B2 | 5/2014 | Eick et al. | |
| 8,960,365 B2 * | 2/2015 | Sheng | G10K 11/172 181/207 |
| 9,520,121 B2 * | 12/2016 | Sheng | G10K 11/172 |

(Continued)

OTHER PUBLICATIONS

Raugh et al., "Modeling California Earthquakes and Earth Structures", Nov. 1985, pp. 14-36.*

(Continued)

*Primary Examiner* — Aaron W Carter
(74) *Attorney, Agent, or Firm* — ConocoPhillips Company

(57) ABSTRACT

A method for modeling and analyzing the impact of different seismic surveying and imaging techniques on a subterranean formation uses a black hole boundary condition around a particular region in the formation where at least one of the physical characteristics is unclear and may distort the seismic modeling results. The black hole boundary conditions will eliminate any energy wave that enters, exit or reflect off the region so as to avoid any image distortion caused by this region. The resulted image data is compared with the image data obtained without using the black hole boundary conditions to determine the impact of this region, and proper correction can be made to more precisely and accurately model the formation.

14 Claims, 3 Drawing Sheets

(56) References Cited

U.S. PATENT DOCUMENTS

| | | | |
|---|---|---|---|
| 9,560,060 B2* | 1/2017 | Baxley | H04L 63/1416 |
| 2003/0060981 A1* | 3/2003 | Routh | G01V 1/30 |
| | | | 702/14 |
| 2004/0172199 A1* | 9/2004 | Chavarria | G01V 1/28 |
| | | | 702/14 |
| 2008/0033656 A1* | 2/2008 | Herwanger | E21B 41/0064 |
| | | | 702/18 |
| 2010/0103773 A1 | 4/2010 | Chiu et al. | |
| 2010/0177595 A1* | 7/2010 | Khare | G01V 1/28 |
| | | | 367/73 |
| 2010/0208554 A1 | 8/2010 | Chiu et al. | |
| 2011/0019502 A1 | 1/2011 | Eick et al. | |
| 2011/0122726 A1* | 5/2011 | Vasconcelos | G01V 1/303 |
| | | | 367/73 |
| 2011/0128818 A1 | 6/2011 | Eick et al. | |
| 2011/0218737 A1* | 9/2011 | Gulati | G01V 1/28 |
| | | | 702/16 |
| 2011/0255371 A1* | 10/2011 | Jing | G01V 1/28 |
| | | | 367/73 |
| 2011/0295510 A1* | 12/2011 | Gulati | G01V 1/28 |
| | | | 702/16 |
| 2012/0039150 A1 | 2/2012 | Eick et al. | |
| 2012/0051181 A1 | 3/2012 | Eick et al. | |
| 2012/0275266 A1 | 11/2012 | Eick et al. | |
| 2012/0281499 A1 | 11/2012 | Eick et al. | |
| 2012/0300585 A1 | 11/2012 | Cao et al. | |
| 2013/0077439 A1* | 3/2013 | Eick | G01V 1/003 |
| | | | 367/73 |
| 2013/0077440 A1* | 3/2013 | Cao | G01V 1/28 |
| | | | 367/73 |
| 2013/0215717 A1* | 8/2013 | Hofland | G01V 1/306 |
| | | | 367/59 |
| 2013/0265851 A1* | 10/2013 | Faber | G01V 1/42 |
| | | | 367/25 |
| 2013/0286780 A1 | 10/2013 | Eick et al. | |
| 2014/0309937 A1 | 10/2014 | Gulati | |
| 2014/0321713 A1 | 10/2014 | Sava et al. | |
| 2016/0238728 A1* | 8/2016 | Eick | G01V 1/36 |
| 2016/0320506 A1* | 11/2016 | Almuhaidib | G01V 1/306 |
| 2017/0059727 A1* | 3/2017 | Eick | G01V 1/003 |

OTHER PUBLICATIONS

List of Free Geophysics Software—http://en.wikipedia.org/wiki/List_of_free_geophysics_software; 1 pg, Oct. 4, 2017.

International Search Report dated Apr. 22, 2016 for PCT/US2016/018154; 4 pgs.

* cited by examiner

BLACK HOLE BOUNDARY CONDITIONS

PRIOR RELATED APPLICATIONS

This application is a non-provisional application which claims benefit under 35 USC § 119(e) to U.S. Provisional Application Ser. No. 62/117,511 filed Feb. 18, 2015, entitled "BLACK HOLE BOUNDARY CONDITIONS," which is incorporated herein in its entirety.

FIELD OF THE DISCLOSURE

The disclosure generally relates to a modeling method to more accurately process the seismic data around an area of uncertain shape, size and other properties, and more particularly, to a modeling method that applies black hole boundary conditions such that the source of inaccurate estimation can be eliminated.

BACKGROUND OF THE DISCLOSURE

Seismic data is collected and processed in the oil industry as a means of imaging a potential geological target for subsequent drilling. Sophisticated computers and modeling software now allow for the careful pre-survey testing of actual field acquisitions scenarios prior to actually sending a crew out to collect a new dataset. Careful testing and computer modeling of the survey offer the potential of saving large sums of money by collecting only the data needed and nothing else, or by avoiding methodologies that can't image the geologic target desired.

One of the problems with computer modeling is that in general the models are not perfectly accurate and precise and do not adequately represent the geology that is being imaged. Because the models are not accurate enough they give misleading results. At the same time, processing of actual field data from a survey tends to lead to very complex images that are contaminated with noise and artifacts that also cause misleading interpretations and results. The problem is how one determines what information is critical and what portion of the model is not accurately represented and causing misleading results.

For the construction of the model, a source signal is propagated through the earth model into the various subsurface layers. Here elastic waves are formed through interaction with the modeled geologic structures in the subsurface layers. Elastic waves are characterized by a change in local stress in the subsurface layers and a particle displacement, which is essentially in the same plane as the wavefront. Acoustic and elastic waves are also known as pressure and shear waves. Acoustic and elastic waves are collectively referred to as the seismic wavefield.

A reflected wavefield may consist of both primary reflections and multiple reflections. Primary reflections may be defined as seismic waves that have reflected only once, from an interface between subterranean formations, before being detected by a seismic receiver. Primary reflections contain the desired information about the subterranean formations that are the goal of seismic surveying. Multiple reflections, or multiples, may be defined as seismic waves that have reflected more than once before being detected by a seismic receiver and depending on the processing algorithms maybe considered additional signal or noise in the dataset.

The measurements acquired in the seismic acquisition are then used to model wave propagation. When an acoustic wave impinges a boundary between two different subsurface materials that have different acoustic transparencies and acoustic impedances, some of the energy of the acoustic wave is transmitted or refracted through the boundary, while some of the energy is reflected off the boundary. This energy that is transmitted and reflected or refracted can either contribute to the image or degrade it, depending on how it is processed.

Often, the cause of inadequate imaging of deep structures lies in the presence of geologic complexity above the target objective. Variations in topography and in the velocity of these shallower layers create distortions in the seismic signal. Strongly refractive layers near the surface can prevent deep penetration of seismic energy, as can intervals of anomalously low velocity. Abrupt lateral changes in near-surface properties can warp raypaths and weaken the effectiveness of traditional processing methods. Locations with rough topography, shallow gas pockets, surface dunes, permafrost and buried soft layers are notorious for the obstacles they present to exploration. Additionally, velocity anomalies within the earth at depth can warp raypaths and create distortions in the seismic signal that are hard to identify with current processing methods.

Thus, in the modeling and processing of seismic data, there exists a flaw in boundary conditions of the various geologic horizons that are typically applied to such data. To keep the size of the computer model within practicable bounds, only a small portion of the ground influenced by the source can be mapped onto a computational domain, while the rest has to be captured by an artificial boundary condition. The flaw in the current modeling method is that unless the earth model is perfect, or in places where there exist errors, the energy propagates through those errors and corrupts the remaining image outside the zone of error leading the interpreter to incorrectly assume that the model is much more accurate than it really is.

Therefore, there is the need for an earth modeling method that avoids any distortions caused by areas where the earth model cannot be accurately determined by altering the typical boundary condition associated with such areas.

SUMMARY OF THE DISCLOSURE

The disclosure relates to modeling and processing of seismic data. When constructing models of geological structures in the computer, it is difficult to precisely and accurately represent the earth structure completely. Thus errors in the construction lead to imperfect models and images of the resulting seismic data. The invention presented here addresses this limitation.

The invention generally is the concept of applying a new boundary condition around areas where there is or is presumed to be insufficient information to model or process that area perfectly or there exists regions that are known to distort the imaging around or beneath them. To do this, we impose a new "black hole-like" boundary condition, wherein like black holes of space nothing ever escapes. Because no energy can ever propagate through this space, the area does not contribute to image distortion in the area surrounding the block hole space. Unless the modeling or processing is perfect, energy would otherwise propagate through the black hole region and perturb the good imaging outside the black hole, corrupting the image and leading to incorrect conclusions on the validity and accuracy of the model.

The present disclosure is therefore a new modeling method where the boundary condition is configured as a "black hole," where no energy can propagate through the boundary to corrupt the subsequent imaging process. In other words, the energy that enters the black hole space is eliminated and is not allowed to corrupt the rest of modeling images. By applying this new condition selectively to various parts of the model or the processing of real data, the data can then be completely processed and the image compared with or without the black hole boundary conditions. This allows the modeler or processor to understand the impact of the black hole region on the final image and understand the region or regions of the model that are likely incorrectly described and modeled.

In one embodiment of this disclosure, the modeling process comprises the steps of: determining a region surrounding an area where at least one physical characteristic cannot be readily identified or measured and cannot be accurately modeled. In this region, a black hole boundary condition body is established with an outer edge of said area set to the black hole boundary condition. As such no energy waves are allowed to propagate past the black hole boundary and through the region. This black hole boundary condition essentially creates a totally absorbing boundary.

Next continued seismic modeling and imaging can be completed and compared to the data where the black hole boundary condition region is not applied. The difference between the two images is the impact of that region on the data set. If the difference is minimal then the region is region is poorly modeled and understood. If the difference is dramatic, then the region is a focal point of energy that will need to be carefully understood and modeled.

In another embodiment of the concept, a shallow gas zone may be modeled as a black hole boundary condition body, which would allow the modeler or processor to understand the impact of how the shallow slow gas layer may act as a lens and defocus the data, corrupting the rest of the image. In this embodiment the black hole conditions are used as a conditioning technique to stop energy during processing and in particular migration from distorting the final image by passing through the gas layer where it is unlikely that the velocities are accurately modeled.

As used herein, the term "black hole" refers to the artificially assigned area where at least one physical characteristic of a subterranean area cannot be accurately and precisely identified or measured. For example, the velocity field, density, porosity, stiffness, or stress of the geophysical conditions will affect the imaging and modeling results, which in turn may change the drilling and completion plans. The region would then be assigned in the model the condition that no energy can every enter it and propagate further.

As used herein, the phrase "black hole boundary" refers to a boundary that mathematically applied to a model, such that waves are not allowed to propagate through the boundary from wither side or the boundary, or even to reflect off the boundary, which surrounds the black hole region.

The invention includes any one or more of the following embodiments in any combination thereof:

The method of this disclosure is for modeling and analyzing the impact of different seismic surveying and imaging techniques on a subterranean formation to avoid image distortion, the method comprising the steps of: i) obtaining a base case seismic data for an area of interest, said base case seismic data comprising a base case image; ii) determining a region in said area of interest, wherein said region has insufficient information for accurate seismic modeling; iii) applying a black hole boundary condition in said region such that no seismic energy waves are allowed to propagate, or pass through said region that impinging upon it; iv) performing seismic forward modeling using a computer with said black hole boundary conditions; v) performing seismic imaging using a computer with said black hole boundary condition to obtain a first image data; vi) comparing, using a computer, said first image data with said base case image to determine an impact of the region on the overall seismic volume and image of said area of interest; and vi) obtaining revised modeling image data of the subterranean formation by correcting said impact.

The instant disclosure also provides a method for modeling and analyzing the impact of different seismic surveying and imaging techniques on a subterranean formation, and the method comprises the steps of: i) creating a computer based model with a region of interest, wherein said region has insufficient information for accurate seismic modeling; ii) creating a black hole boundary condition in said region such that no seismic energy waves are allowed to propagate or pass through said region; iii) performing seismic modeling with and without using said hole boundary condition; iv) comparing imaged data with and without the black hole boundary conditions to determine an impact of the region on the overall seismic volume and image; and v) obtaining revised modeling image data of the subterranean formation by correcting said impact in the image data without the black hole boundary condition.

The black hole boundary conditions exist so that during modeling and processing stage, any energy waves entering the region, exiting the region, or reflecting off the region will be mathematically eliminated so as to prevent any distortion to the resulting image data.

It is expected that the location and size of region having the black hole boundary conditions can be modified so as to further explore the subterranean formation where physical characteristics are poorly understood or measured, as is often the case in actual seismic survey.

By "obtaining" seismic data and such herein we do not mean to imply an actual seismic survey and collection of data, which is typically performed in advance of data processing and imaging and may be by different parties. Merely obtaining a copy of the available data will suffice.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

DETAILED DESCRIPTION

In the following description numerous details are set forth to provide an understanding of the present disclosure. However, it will be understood by those of ordinary skill in the art that the present disclosure may be practiced without these details and that numerous variations or modifications from the described embodiments may be possible.

In the present disclosure, the concept is to create a black hole boundary/space around a black hole region in the model where accurate profile or velocity field data is not available or the area is suspected as causing distortion and corruption of the rest of the image. As such in both the modeling and processing steps, no energy is allowed to pass through the boundary or black hole space, hence no reflected or refracted energy from this region will be allowed to distort the remainder of the image.

Figure 1:
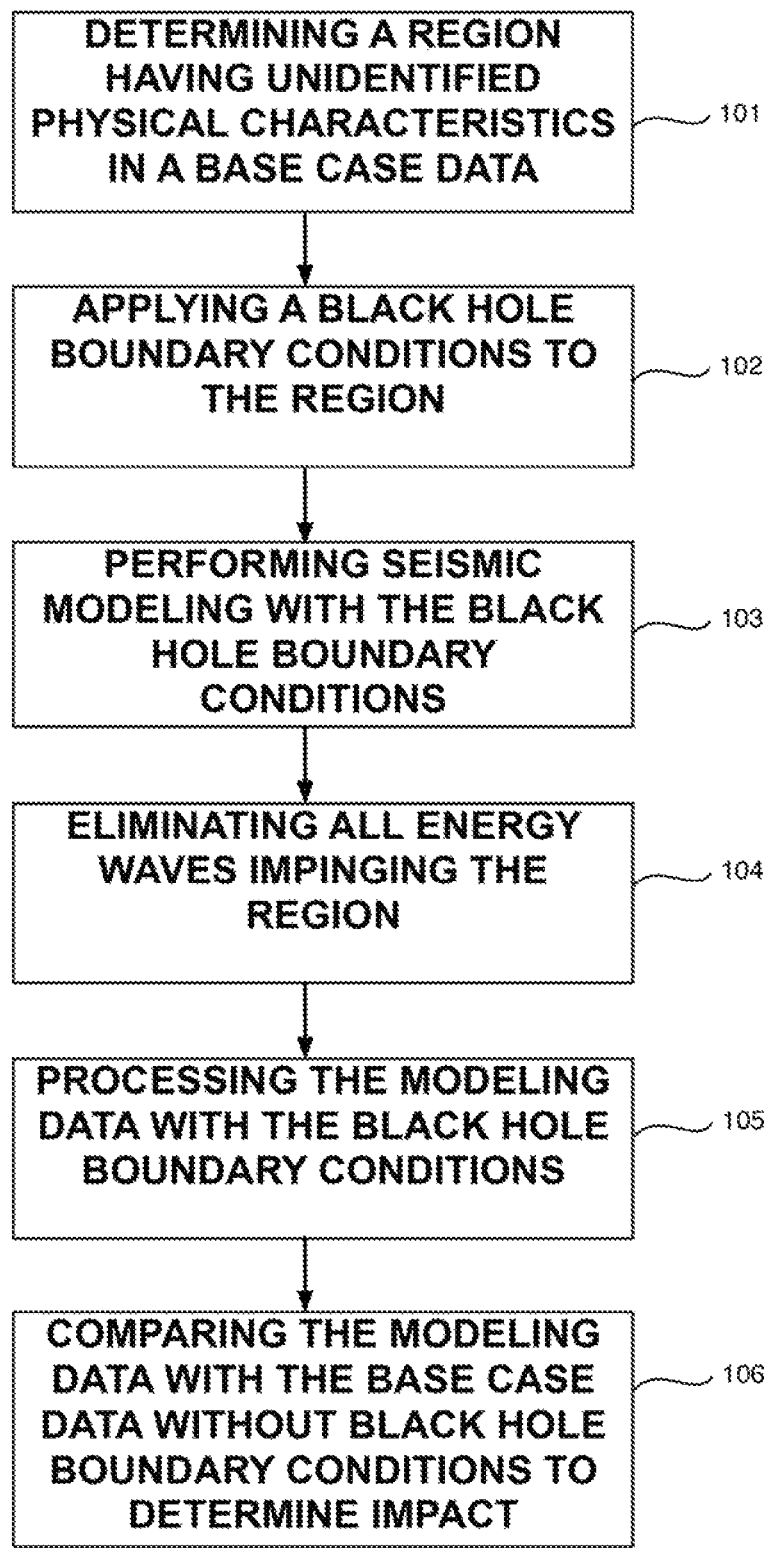
FIG. 1 is a flow chart illustrating the steps of the modeling method of this disclosure.

FIG. 1 is a flow chart describing the steps of the modeling method described herein. The method is based on existing seismic data of a certain formation, in which certain areas have uncertain physical characteristics that cannot be measured using current model. In the first base case the data is modeled and imaged with no restrictions forming a base case image.

In step 101, a black hole boundary condition area is determined from the base case seismic data, wherein the region is suspected or known to have been unidentified with some incorrect velocity field, stiffness, porosity, stress, etc., or some other parameter that is critical to accurate modeling of the subterranean formation.

In step 102, black hole boundary conditions are applied to the perimeter of the region so as to enclose it. Such black hole boundary ensures that no energy wave can propagate through the region.

In step 103, the modeling process is initiated with the black hole boundary conditions applied.

In step 104 all energy waves that impinge the black hole boundary condition region are eliminated. Thus, any signals passing therethrough are zeroed and no longer modeled or processed.

In step 105, the resulting modeling data is then processed and imaged, also with the black hole boundary conditions, so that the corresponding elimination will be taken into consideration to avoid inconsistent results.

Finally in step 106, the black hole conditioned data and the base case conditioned data are compared and studied. The difference between the two images is the impact of the region being considered.

As an example, consider a shallow gas cloud layer in which the velocity field cannot be accurately determined and we wish to image the area under and around the layer. During the modeling phase, when energy waves are being propagated though the model, any errors in the estimation of the gas cloud size, shape or properties cause the energy to be distorted and corrupt the image beneath and around the gas cloud. By iteratively comparing different proposed acquisitions geometry's and different sizes and shapes of gas clouds one can determine to what degree we can accurately acquire data to image the structure underneath the gas cloud.

Figure 2:
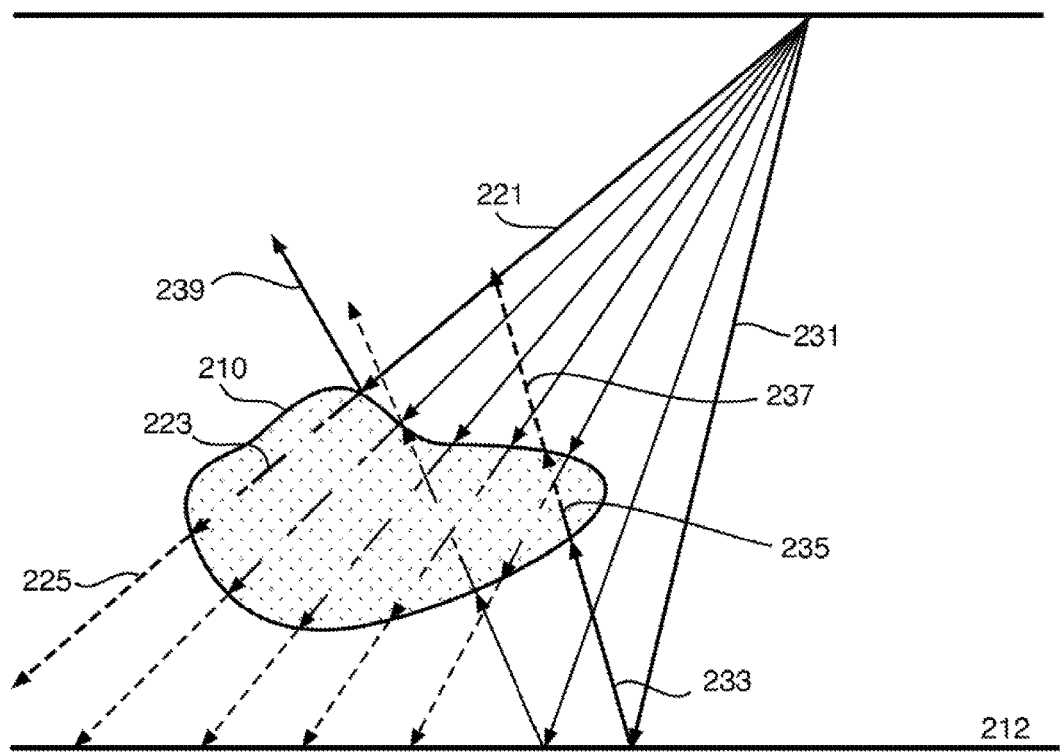
FIG. 2 shows the potential distortion of the modeling data without the black hole boundary conditions around the area of uncertain shape, size and properties.

For example, in FIG. 2 shows a gas cloud 210 with unknown shape, size and physical properties. In this example, only the energy waves that may pass through the gas cloud 210 are shown, including those reflected from the reflective interface 212 between two formations. Here only one interface between formations is shown, but in reality there are multiple interfaces involved in seismic modeling, which further complicates the modeling/processing of seismic data if the source of contamination is not isolated or eliminated.

Energy wave propagating along the path 221 will enter the gas cloud 210 along path 223, and then exit along path 225. Similarly, energy wave propagating along path 231 will be reflected along path 233 and enter the gas cloud 210 along path 235, eventually leaving along path 237. Because the gas cloud 210 has undetermined shape, size and properties, especially velocity fields therein, this may significantly impact the modeling result. As a consequence, the energy waves along paths 223 and 235 are likely to contaminate the modeling result because their propagating velocity inside the gas cloud 210 is unknown. Similarly, the energy waves along paths 225 and 237 are also likely to contaminate the modeling result because their estimation is based on incorrect results previously obtained along paths 223 and 235. Furthermore, some energy waves may be reflected off of the region along path 239 due to the change in physical properties. These are all possible sources of distorting the image data.

Figure 3:
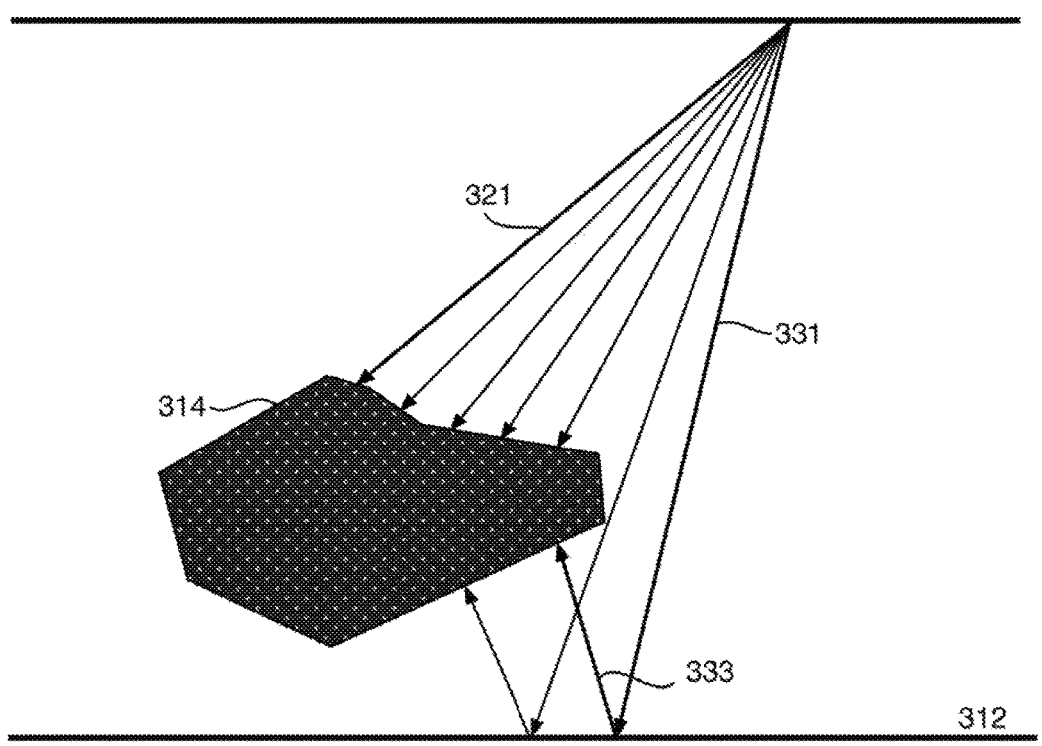
FIG. 3 shows the application of the black hole boundary conditions that eliminates sources of inaccurate modeling from the grey area of uncertain properties.

Thus, to evaluate if undershooting the gas cloud 210 could actually image the structure, one can apply the black hole boundary conditions in both the modeling and processing, as shown in FIG. 3, and then determine if it would be possible to undershoot the gas cloud and obtain a good image by using data that has never been through the distortion field of the gas cloud.

In FIG. 3, black hole boundary conditions 314 are set to enclose the gas cloud (not shown). Therefore, energy waves propagating along path 321 will not enter the gas cloud because the black hole boundary conditions 314 will eliminate such waves. Similarly, energy waves propagating along path 331, reflected by interface 312 along path 333 will not enter the gas cloud also because the black hold boundary conditions 314 will eliminate such waves. The resulting modeling data is therefore free from any distorted results and can therefore generate much more accurate images of the subterranean formation.

The size and location of the area for setting black hole boundary conditions can be varied iteratively throughout the formation so that through optimized correction more accurate seismic imaging result can be achieved. Or in the alternative, the black hole boundary conditions can be configured to encompass only part of the region to approximate the actual physical boundaries of the region. Either method allows the modeler to back engineer the size and shape of distorting region which can then be studied in more detail for future analysis.

Our modeling data to date has shown that this technique allows the potential to shoot in areas where by conventional modeling and processing one would believe that they could not actually image the structure, but with the black hole boundary conditions one can see the structure such that it may become a prospective for future drilling.

Another example would be a salt mushroom or dome. Near the salt dome the highly reflective surface of the dome has to be precisely modeled and this is very hard to do, particularly underneath the mushroom dome. Any energy propagating through the salt and refracting out causes a distortion of the image in the proximity of the dome.

If on the other hand we apply the black hole boundary conditions to the salt dome and not allow any of the distorting energy to get into the dome and reflect or refract off of it, then the rest of the data that is not corrupted or distorted by the salt and can be used to more accurately image the structure.

This method can be applied to new software or to any existing software platform for doing e.g., 2D, 3D, 4D and even 5D seismic processing and imaging provided the appropriate coding or module is applied thereto and otherwise consistent with the programming parameters. Exemplary software includes, e.g., our preferred Landmark's SeisSpace®, Petrel E&P, PetroSys, Omega, GeoPro, SeisWare Seismic Software, Paradigm Echos® seismic processing and imaging solutions, GeoCraft, and the like.

Further, the seismic processing and imaging software can be combined with other reservoir and geological modeling systems, such as geophysical model building, rock physics evaluation, and reservoir modeling, e.g., IBM® System Blue Gene/P® Solution, the Jason™ software suite, JewelSuite, and the like.

Hardware may preferably include massively parallel and distributed Linux clusters, which utilize both CPU and GPU architectures. Alternatively, the hardware may use a LINUX OS, XML universal interface run with supercomputing facilities provided by Linux Networx, including the next-generation Clusterworx Advanced cluster management system.

Another system is the Microsoft Windows 7 Enterprise or Ultimate Edition (64-bit, SP1) with Dual quad-core or hex-core processor, 64 GB RAM memory with Fast rotational speed hard disk (10,000-15,000 rpm) or solid state drive (300 GB) with NVIDIA Quadro K6000 graphics card and multiple high resolution monitors.

Slower systems could also be used but are less preferred since seismic processing and imaging is already compute intensive and applying the inventive method is not a trivial computer exercise.

The following references are incorporated by reference in their entirety.

Albert C. Reynolds' Boundary conditions for the numerical solution of wave propagation problems can be found in Geophysics 43(6), 1099-1110 (1978).
U.S. Pat. No. 8,717,846 4D seismic signal analysis
U.S. Pat. No. 8,467,267 Asynchronous operation of seismic sources in a seismic survey
U.S. 20110128818 Extraction of discrete records from continuous seismic recordings
U.S. 20110019502 Practical autonomous seismic recorder implementation and use
U.S. 20100208554 Multiple seismic signal inversion
U.S. 20100103773 Simultaneous Multiple Source Extended Inversion
U.S. 20120275266 Simultaneous conventional and phase-encoded seismic acquisition
U.S. 20130286780 Distinctive land seismic sweep
U.S. 20120039150 Unique seismic source encoding
U.S. 20120281499 Continuous seismic acquisition
U.S. 20120051181 Caterpillar-style seismic data acquisition using autonomous, continuously recording seismic data recorders
U.S. 20120300585 Reciprocal method two-way wave equation targeted data selection for seismic acquisition of complex geologic structures

The invention claimed is:

1. A method of seismic processing and imaging to avoid image distortion, said method comprising the steps of:
   i) obtaining a base case seismic data from a subterranean formation, said base case seismic data including a base case image of said subterranean formation;
   ii) determining a black hole region in said subterranean formation, wherein said black hole region has at least one physical characteristic not readily available and insufficient information for accurate seismic modeling;
   iii) defining a black hole boundary condition around said black hole region to reduce or eliminate image distortion wherein image distortion is caused by seismic energy waves interacting with said boundary;
   iv) performing seismic forward modeling with said black hole boundary condition applied thereto;
   v) generating a reservoir image from said modeling;
   vi) comparing said reservoir image with said base case image to determine an impact of the black hole region on said reservoir image; and
   vii) obtaining a revised reservoir image of the subterranean formation by correcting for said impact.

2. The method of claim 1, wherein said physical characteristic is velocity field, density, porosity, stiffness, or stress.

3. The method of claim 1, wherein said black hole boundary condition eliminates any energy waves entering the region in the seismic forward modeling in step iv).

4. The method of claim 3, wherein said black hole boundary condition eliminates any energy waves exiting the region.

5. The method of claim 1, wherein said black hole boundary condition eliminates any energy waves reflecting off the region.

6. The method of claim 1, wherein said black hole boundary condition eliminates any energy waves entering and exiting said region.

7. The method of claim 1, wherein said black hole boundary condition eliminates any energy waves entering and exiting said region or reflecting off said region.

8. The method of claim 1, further comprising:
   viii) modifying the location or size of the black hole region in step iii); and
   ix) repeating steps iii) to v) to obtain a second reservoir image data and repeating steps iv) to vii) to obtain a second revised reservoir image.

9. A method of seismic data processing and imaging of a subterranean formation, comprising the steps of:
   i) creating a computer based model of a subterranean formation, wherein said model has a black hole region with at least one physical characteristics not readily available and insufficient information for accurate seismic modeling;
   ii) applying a black hole boundary condition around said black hole region to reduce or eliminate image distortion wherein image distortion is caused by seismic energy waves interacting with said boundary;
   iii) performing seismic modeling with and without using said hole boundary condition to generate reservoir images;
   iv) comparing reservoir images with and without the black hole boundary condition to determine an impact of said black hole region on the reservoir image; and
   v) obtaining a revised reservoir image of the subterranean formation by correcting said impact in the image without the black hole boundary condition.

10. The method of claim 9, wherein said physical characteristic is velocity field, density, porosity, stiffness, or stress.

11. The method of claim 9, wherein said black hole boundary condition eliminates any energy waves exiting the black hole region.

12. The method of claim 9, wherein said black hole boundary condition eliminates any energy waves reflecting off the black hole region.

13. The method of claim 9, wherein said black hole boundary conditions eliminates any energy waves entering and exiting said black hole region.

14. The method of claim 9, further comprising:
i) modifying the location or size of the black hole region in step i); and
ii) repeating steps i) to v) to obtain a further revised image.

* * * * *